United States Patent
Greczyna et al.

(10) Patent No.: US 7,029,774 B1
(45) Date of Patent: Apr. 18, 2006

(54) MAGNETIC RECORDING MEDIUM WITH BACKSIDE TO DECREASE RECORDING SURFACE EMBOSSMENT

(75) Inventors: James A. Greczyna, Vadnais Heights, MN (US); Brian D. Brong, Oakdale, MN (US); Stephen R. Ebner, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/135,783

(22) Filed: May 23, 2005

(51) Int. Cl.
*G11B 5/735* (2006.01)

(52) U.S. Cl. .................. 428/845.5; 428/845.2

(58) Field of Classification Search ............. 428/845.5, 428/845.2
See application file for complete search history.

(56) References Cited

U.S. PATENT DOCUMENTS

| | | | |
|---|---|---|---|
| 6,558,774 B1 | 5/2003 | Saliba et al. | |
| 6,673,475 B1 | 1/2004 | Oikawa et al. | |
| 6,797,373 B1 | 9/2004 | Noguchi et al. | |
| 6,821,574 B1 | 11/2004 | Ebner et al. | |
| 6,896,959 B1 | 5/2005 | Edwards | |
| 2005/0053804 A1 | 3/2005 | Kato | |

FOREIGN PATENT DOCUMENTS

| | | |
|---|---|---|
| JP | 2004319015 A | 11/2004 |
| JP | 2004319016 A | 11/2004 |

*Primary Examiner*—Stevan A. Resan
(74) *Attorney, Agent, or Firm*—Eric D. Levinson (57) ABSTRACT

A magnetic recording medium including a substrate, a magnetic side, and a backside. The substrate defines a first surface and a second surface opposite the first surface. The magnetic side is formed over the first surface of the substrate and defines a recording surface. The backside is coated on the second surface of the substrate and is configured to decrease embossment of the recording surface. The backside defines a backside surface opposite the substrate. The backside surface having a skew less than about 0.5 and a kurtosis less than about 4.0.

20 Claims, 4 Drawing Sheets

MAGNETIC RECORDING MEDIUM WITH BACKSIDE TO DECREASE RECORDING SURFACE EMBOSSMENT

THE FIELD OF THE INVENTION

The present invention relates to a magnetic recording media, such as magnetic tapes, having a backside configured to decrease pitting or embossment of the magnetic recording media. More particularly, the backside is configured to decrease pitting or embossment of a recording surface of the magnetic recording media.

BACKGROUND

Magnetic recording media are widely used in audio tapes, video tapes, computer tapes, disks and the like. Magnetic media may use thin, metal layers as the recording layers or may comprise particulate magnetic compounds as the recording layer. The latter type of recording media employs particulate material such as ferromagnetic iron oxides, chromium oxides, ferromagnetic alloy powders and the like dispersed in binders and coated on the substrate. In general terms, magnetic recording media generally comprises a magnetic side coated onto at least one surface of a non-magnetic substrate (e.g., a film for a magnetic recording tape applications). In certain designs, the magnetic side is formed of a single layer directly onto the non-magnetic substrate. In an alternative approach, a dual layer magnetic side construction is employed, including a lower support layer coated onto the substrate and a thin magnetic recording layer coated onto the lower support layer. The two layers may be formed simultaneously or sequentially. The support layer is typically non-magnetic and generally comprised of a non-magnetic powder dispersed in the binder. Conversely, the magnetic recording layer comprises one or more metal particle powders or pigments dispersed in the binder system.

Magnetic tapes may also have a backside coating applied to the opposing side of the non-magnetic substrate in order to improve the durability, electroconductivity, and tracking characteristics of the magnetic recording media. The backside coatings are typically combined with a suitable solvent to create homogenous mixture which is then coated onto the substrate. The coated substrate is dried, calendered if desired, and cured. The formulation for the backside coating also comprises pigments in a binder system.

Figure 1:
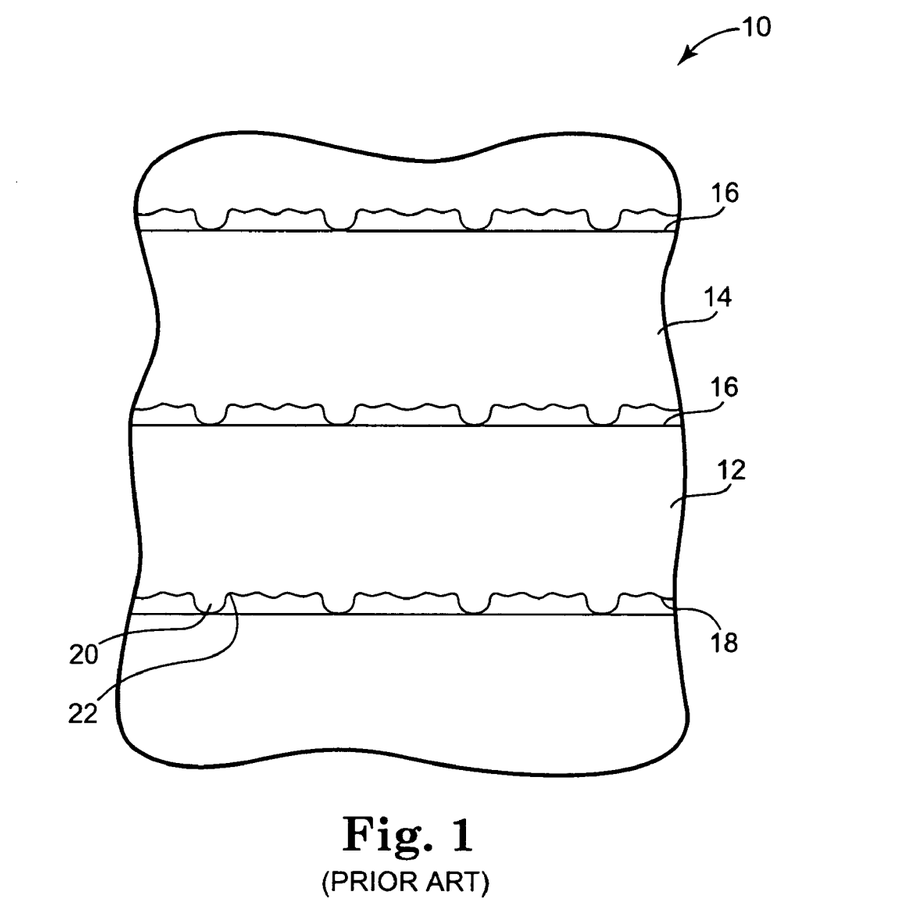
FIG. 1 is a schematic, side view illustration of a portion of a prior art, wound, magnetic recording medium.

Typical backsides include carbon black or other material having particle sizes configured to form a smooth background with some larger particles dispersed therein to generally improve durability and frictional characteristics of the backside during manufacturing and use. For example, FIG. 1 illustrates a portion of a prior art magnetic recording medium 10 in the form of a wound, magnetic recording tape. When the magnetic recording tape is wound, a single length of the magnetic recording tape is wrapped to define a first winding 12 and a second winding 14 circumferentially extending around the first winding 12, where a portion of each winding 12 and 14 is illustrated in FIG. 1. Other windings of the magnetic storage tape 10 extend circumferentially around the second winding 14 and/or extend below the first winding 12. Each winding 12 and 14 defines a recording or front surface 16 and a backside or back surface 18 opposite the recording surface 16. As illustrated, the features of backside surface 18 are greatly exaggerated for illustrative purposes. When wound, the backside surface 18 of the second winding 14 interfaces with the recording surface 16 of the first winding 12.

Typical magnetic recording mediums include backside surfaces 18 having bimodal roughness defined by a relatively smooth general characteristic with a plurality of relatively large particles dispersed thereon to decrease friction and increase durability. The bimodal roughness of the backside surface 18 defines a plurality of peaks 20 and valleys 22. Since the second winding 14 extends on top of or around the first winding 12, when wound, the peaks 20 of the second winding 14 contact the front surface 16 of the first winding 12 and the valleys 22 and other areas of the backside surface 18 may not actually contact the first winding 12.

With this in mind, the contact area between adjacent windings 12 and 14 is limited, which serves to decrease friction between windings 12 and 14 as well as between the magnetic recording tape 10 and read/write mechanisms during use. In some instances, the interaction between the peaks 20 of the second winding 14 and the front surface 16 of the first winding 12 causes the peaks 20 to be imprinted or otherwise transmitted to the front surface 16 of the first winding 12. The imprints, pits, or embossments defined in the front surface 16 can damage the recording characteristics of the magnetic recording tape 10. With the above in mind, it is desirable to create a magnetic recording medium having a backside configured to improve the durability and frictional characteristics of the magnetic recording medium while decreasing embossment of the recording surfaces of the magnetic recording medium.

SUMMARY

One aspect of the present invention relates to a magnetic recording medium. The magnetic recording medium includes a substrate, a magnetic side, and a backside. The substrate defines a first surface and a second surface opposite the first surface. The magnetic side is formed over the first surface of the substrate and defines a recording surface. The backside is coated on the second surface of the substrate and is configured to decrease embossment of the recording surface. The backside defines a backside surface opposite the substrate. The backside surface has a skew less than about 0.5 and a kurtosis less than about 4.0.

Another aspect of the present invention relates to a magnetic recording medium. The magnetic recording medium includes a substrate, a magnetic side, and a backside. The substrate defines a first surface and a second surface opposite the first surface. The magnetic side is coated on the first surface of the substrate and defines a recording surface. The backside is coated on the second surface of the substrate and is configured to decrease the embossment of the recording surface. The backside defines a backside surface opposite the substrate. The backside surface has a skew less than about 0.5 and a peak-to-valley roughness less than about 325 nm.

Another aspect of the present invention relates to a magnetic recording medium. The magnetic recording medium includes a substrate, a magnetic side, and a backside. The substrate defines a first surface and a second surface opposite the first surface. The magnetic side is coated on the first surface of the substrate and defines a recording surface. The backside is coated on the second surface of the substrate and is configured to decrease the embossment of the recording surface. The backside defines a backside surface opposite the substrate. The backside surface has a kurtosis parameter of less than about 4.0 and a peak height mean less than about 200 nm.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

In the following detailed description, specific embodiments are described indicating examples of ways in which the invention may be practiced. It is to be understood that other embodiments may be utilized and structural or logical changes may be made without departing from the scope of the present invention. The following detailed description, therefore, describes certain embodiments of the invention and is not to be taken in a limiting sense. The scope of the present invention is defined by the appended claims.

Figure 2:
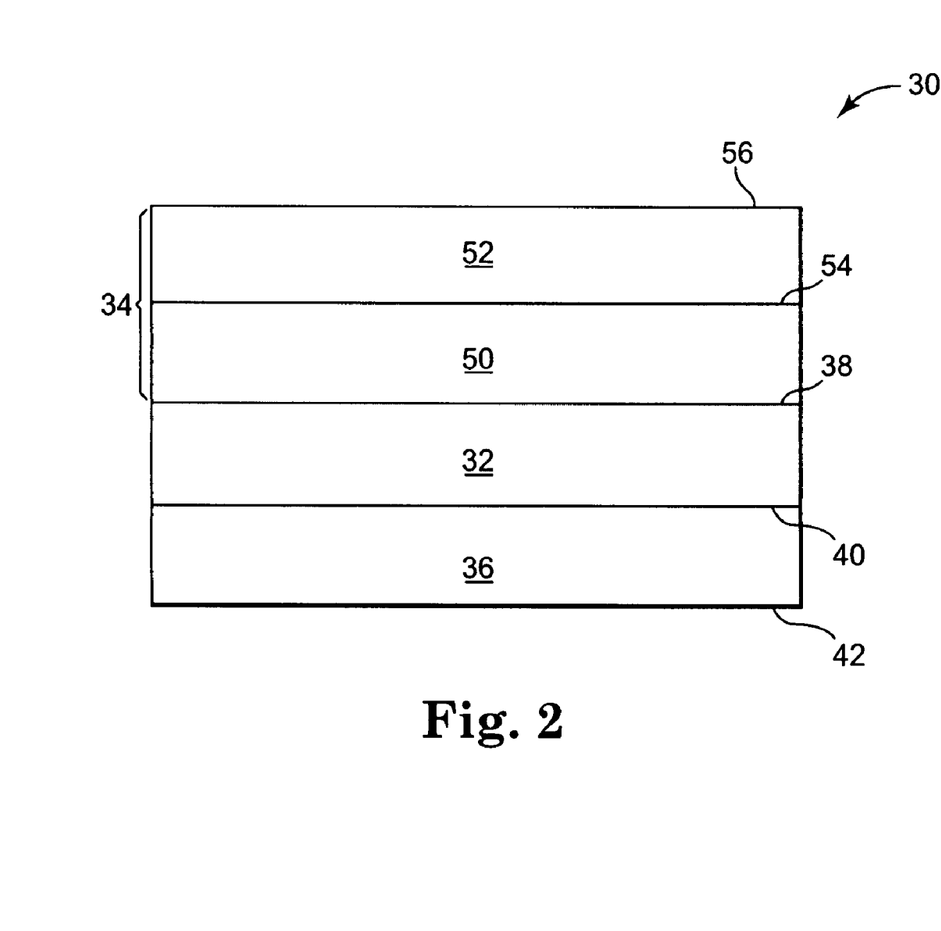
FIG. 2 is a schematic illustration of a cross-sectional view of one embodiment of a magnetic recording medium.

Turning to the figures, FIG. 2 illustrates a schematic, cross-sectional view of a magnetic recording medium 30. Magnetic recording medium 30 generally includes a substrate 32, a magnetic side 34, and a backside or backcoat 36. The substrate 32 defines a first or top surface 38 and a back or bottom surface 40 opposite the top surface 38. The magnetic side 34 generally extends over and is bonded to the top surface 38 of the substrate 32. The magnetic side 34 provides the recordable material to the magnetic recording medium 30. The backside 36 generally extends along and is bonded to the bottom surface 40 of the substrate 32. Accordingly, the backside 36 defines an outer or backside surface 42 opposite the substrate 32. The backside 36 generally provides support and adds additional durability to the magnetic recording medium 30. In one embodiment, the magnetic recording medium 30 is a magnetic recording tape.

The magnetic recording medium 30 generally provides for improved signal-to-noise ratios and decreases error rate properties as compared to conventional media. More specifically, the magnetic recording medium 30 exhibits improved signal and error characteristics by decreasing pitting or embossment of the recording surface 56. In one embodiment, the improved characteristics include signal-to-noise ratios and small error rates. In one embodiment, the magnetic recording medium 30 also decreases the variation of signal-to-noise ratios and small error rates along a length of the magnetic recording medium 30 as compared to conventional media.

The Substrate

The substrate 32 is any conventional non-magnetic substrate useful as a magnetic recording medium support. Examples of substrate materials useful for the magnetic recording medium 30 include polyesters such as polyethylene terephthalate (PET), polyethylene naphthalate (PEN), a mixture of polyethylene terephthalate and polyethylene naphthalate; polyolefins (e.g., polypropylene); cellulose derivatives; polyamides; and polyimides. In one example, polyethylene terephthalate or polyethylene naphthalate is preferably employed as the substrate 32. In general, the substrate 32 is in elongated tape form or is an elongated sheet configured to subsequently be cut into elongated tape form.

The Magnetic Side

The magnetic side 34 is formed in one of a dual-layer or single-layer construction. In one embodiment, in which the magnetic side 34 is formed of dual-layer construction, the magnetic side 34 includes a support or lower layer 50 and a magnetic recording or upper layer 52. The support layer 50 extends over and is bonded to the top surface 38 of the substrate 32. The support layer 50 defines a top surface 54 opposite the top surface 38 of the substrate 32. The magnetic recording layer 32 extends over and is bonded to the top surface 54 of the support layer 50. As such, the magnetic recording layer 52 defines an outer or recording surface 56 opposite the support layer 50. The terms "layer" and "coating" are used interchangeably herein to refer to a coated composition. In other embodiments, the magnetic side 34 is formed of single layer construction in which the support layer 50 is eliminated and the magnetic layer 42 is bonded directly to the substrate 32. In one embodiment, magnetic side 34 is formed by a suitable combination of one or more layers that defines a recording surface 56 opposite the substrate 32.

The support layer 50 is essentially non-magnetic and, in one embodiment, includes a non-magnetic or soft magnetic powder and a resin binder system. As used herein, the term "soft magnetic powder" refers to a magnetic powder having a coercivity of less than about 300 Oersteds. By forming the support layer 50 to be essentially non-magnetic, the electromagnetic characteristics of the magnetic recording layer 52 are not substantially adversely affected. However, to the extent that no substantial adverse effect is caused, the support layer 30 may contain a small amount of magnetic powder. In one embodiment, the support layer 30 may also include at least one of a primary pigment material, conductive carbon black, an abrasive or head cleaning agent, a binder resin, a head cleaning agent binder, a service treatment agent, a lubricant, stearic acid, and/or solvents. The materials for the support layer 50 are mixed and the support layer 50 is subsequently coated on upper surface 38 of the substrate 32.

In one embodiment, the magnetic recording layer 52 includes a dispersion of magnetic pigments, an abrasive or head cleaning agent, a binder system, one or more lubricants, a conventional surfactant or wetting agent, and/or one or more solvents. The dispersion of magnetic pigments includes metallic iron and/or alloys of iron and is configured to provide a generally reliable and durable surface for recording and storing data. The materials for the magnetic recording layer 52 are mixed together and coated onto the upper surface 54 of the support layer 50. In one embodiment, the magnetic recording layer 52 is applied to the support layer 50 in order to provide the recording surface 56 with properties configured to increase signal-to-noise ratios and to decrease error ratings for the magnetic recording medium 30.

The Backside

The backside 36 is configured to improve durability of the magnetic recording medium 30 as well as the amount of friction between the magnetic recording medium 30 and read/write mechanisms. The backside 36 primarily consists of one or more magnetic or non-magnetic particles such as carbon black, alumina, silicon dioxide, titanium dioxide, and the like. The particles are dispersed as inks with appropriate binders, surfactants, ancillary particles forming a binder system, and solvents therefore. In one embodiment, the binder system includes at least one of a polyurethane resin and nitrocellulose blended appropriately to modify coating stiffness as desired.

In one embodiment, the backside 36 comprises carbon black particles combined with appropriate binder resins. In one example, the backside 36 of the magnetic recording medium 30 includes from about 20 to about 50 percent per unit weight, more preferably from about 30 to about 40 percent per unit weight, of carbon particles based on the total composition weight of the backside 36.

The backside 36 is configured to provide a relatively random backside surface 42 (e.g., a surface approaching a Gaussian surface) as compared to the typical bimodal backside surface 18 (FIG. 1) common in the prior art. With this in mind, the carbon black particles of the backside 36 are substantially uniform in size. In one embodiment, the carbon black particles are chosen from one or more groups having a primary particle or average particle size from about 10 nm to about 30 nm, more preferably, on the order of about 15 nm to about 25 nm, and therefore, the carbon black particles are generally uniform in size for the purposes of this application. In one embodiment, the average primary particle size of the carbon black particles is less than about 100 nm. In one embodiment, the use of substantially uniform particles actually provides backside surface 42 as a rougher overall surface than prior art, since the main surface is not specifically configured to be smooth. However, since the large particles are generally not utilized in the backside 36, the backside surface 42 generally decreases the number and/or predominance of any pits or embossments formed in recording surface 56.

Figure 3:
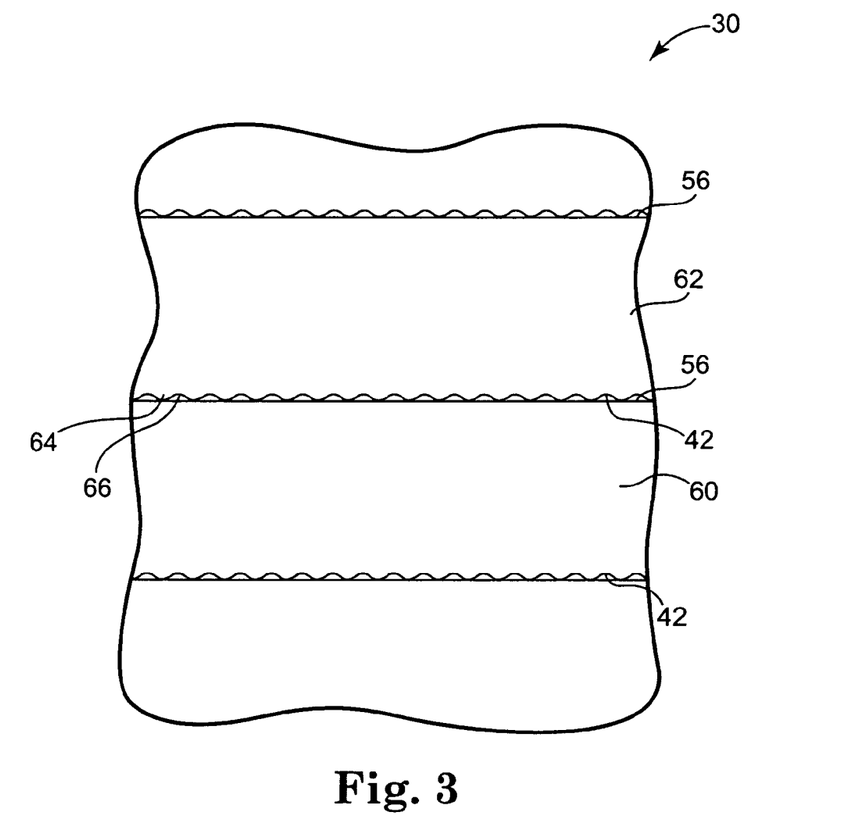
FIG. 3 is a schematic, side view illustration of a portion of one embodiment of a wound, magnetic recording medium.

Additionally referring to FIG. 3, the magnetic recording medium 30 is wound upon itself in a circular fashion during a portion of the manufacturing process and periodically during use. With this in mind, when wound a single length of the magnetic recording medium 30 is wound to define a first winding 60 and a second winding 62 circumferentially wound about the first winding 60. Each winding 60 and 62 defines the back surface 42 having peaks 64 and valleys 66 opposite the recording surface 56. As illustrated in FIG. 3, the peaks 64 and the valleys 66 are exaggerated for illustrative purposes only. The peaks 64 are generally not as large as the peaks seen with bimodal backside surfaces (see for example peak 20 of FIG. 1).

In this manner, since a larger number of peaks 44 are provided with relatively small and uniform heights, a relatively large plurality of peaks 64 contacting the recording surface 56 of an adjacent winding 60 or 62. The large number of the peaks 64 contacting the recording surface 56 provide a large surface area of the backside surface 42 contacting the adjacent recording surface 56. The large surface area of the backside surface 42 contacting the adjacent recording surface 56 serves to distribute the load transferred from backside 36 to the adjacent recording surface 56 across a large area of the recording surface 56. When the load is distributed over a larger area of the recording surface 56, as opposed to a few localized areas of the recording surface 56 as in the prior art, each point of the recording surface 56 contacting the backside surface 42 of the adjacent winding 62 bears a smaller portion of load.

Embossments or pits are generally formed in recording surfaces similar to recording surface 56 due to the application of force (i.e. load) at discrete points along the recording surface 56. In particular, the peaks 64 of the backside surface 42 contact the recording surface 56 when wound and are generally pressed against the adjacent recording surface 56 as described above. The pressure often causes pits or embossments to be formed in the recording surface 56, which can decrease the signal-to-noise ratio and increase errors in writing to and reading from the magnetic recording medium 30. In view of the above, since each area of recording surface 56 that contacts the adjacent backside surface 42 bears a relatively small load as compared to prior art magnetic recording mediums (such as magnetic recording medium 10 illustrated in FIG. 1), the number of pits or embossments formed in recording surface 56 are decreased and/or the pits or embossments formed are less pronounced. In particular, the pits or embossments formed in recording surface 56 are generally shallow in depth and relatively small in diameter as opposed to the pits or embossments formed in the recording surfaces in the prior art. By decreasing the recording surface pits and embossments, the electromagnetic performance and reliability, including signal-to-noise ratios and errors, of the recording surface 56 is improved.

In one embodiment, the backside 36 serves to decrease variation of signal-to-noise ratios and/or errors along a total length of the magnetic recording medium 30. In one example, a first skirt signal-to-noise ratio measured at any first location along a total length of the magnetic recording medium 30 varies from a second skirt signal-to-noise ratio measured at any second location along the total length of the magnetic recording medium 30 by less than about 0.5 dB. In one example, a first small error rate measured at any first location along a total length of the magnetic recording medium 30 varies from a small error rate measured at any second location along the total length of the magnetic recording medium 30 by less than about 0.25 error/m.

Dispersions for forming the backside 36 may further comprise one or more wetting agents. Useful wetting agents include lecithin, emcol acetate, phosphorylated polyoxyalkyl polyols, surfactants, a dispersant such as a modified polyester resin, and the like.

Solvents used to create dispersions include methylethylketone, toluene, and cyclohexanone, and blends thereof, as well as other solvents or solvent combinations including, for example, xylene, methyl isobutyl ketone, methyl amyl ketone, and other suitable solvents. In one embodiment, the solvent used with the backside 36 is a blend including about 60 to about 80 percent per unit weight of methylethylketone, about 20 to about 30 percent per unit weight of toluene, and from about 1 to about 10 percent per unit weight cyclohexanone. In a more particular example, the solvent includes about 75 percent per unit weight of methylethylketone, about 20 percent per unit weight of toluene, and about 5 per unit weight cyclohexanone.

The dispersion formulation for the backside 36 further includes an activator or crosslinking agent. In one embodiment, the activator has a chemical formulation including tetramethylol propane (TMP) adduct, and butanediol adduct in methylethylketone (MEK). Use of other activators in the backside 36 is also contemplated.

Manufacturing Process

For manufacturing, each of the components of the support layer 30 are combined in a manner described above to form a coating to be applied to the substrate 32. Similarly, each of the magnetic recording layer 52 and the backside 36 are also mixed to form the respective coating mixtures for subsequent addition to the magnetic recording medium 30.

In one embodiment, the particular process for manufacturing of magnetic recording medium 30 includes an in-line portion and one or more off-line portions. The in-line portion includes unwinding the substrate 32 for other material from a spool or supply. The substrate 32 is coated with the backside 36 material on the lower side 40 of substrate 32, and the backside 36 is dried, typically using conventional ovens. The magnetic side 34 is also applied to the substrate 32. For the dual-layer magnetic side 34, the support layer 50 is first applied directly to the substrate 32 and the magnetic recording layer 52 is then coated atop the support layer 50. Alternatively, the magnetic side 34 can be applied to the substrate 32 prior to application of the backside 36 to the substrate 32. In one embodiment, the support layer 50, magnetic layer 52, and backside 36 are applied to substrate 32 or each other using wet-on-wet, dual-slot, sequential dye, or other coating process. In embodiments employing single layer magnetic side 34 construction, the magnetic recording layer 52 is applied directly to the substrate 32.

The coated substrate 32 is magnetically orientated and dried, and then proceeds to the in-line calendering station. More specifically, the magnetic recording medium 30 is orientated by being advanced through one or more magnetic fields to generally align the magnetic orientation of the metal particles of the magnetic recording layer. In one example, each magnetic field is formed by electric coils and/or permanent magnets.

According to one embodiment, called compliant-on-steel (COS), in-line calendering uses one or more in-line nip stations, in each of which a steel or other generally non-compliant roller contacts or otherwise is applied to the recording surface 56 and a rubberized or other generally compliant roll contacts or otherwise is applied to the outer surface backside 36 opposite the substrate 32. The generally non-compliant roll is applied to provide a desired degree of smoothness to the magnetically coated side of the substrate 32. In one embodiment, calendering further includes heating the rollers contacting the magnetic recording medium.

Alternatively, the in-line calendering is "steel-on-steel" (SOS), meaning both opposing rolls are steel. The process may also employ one or more nip stations each having generally non-compliant rolls. After in-line calendering, the coated substrate 32 is wound. The process then proceeds to an off-line portion which occurs at a dedicated stand-alone machine. The magnetic recording medium 30 is unwound and calendered. The off-line calendering includes passing the magnetic recording medium 30 through a series of generally non-compliant rollers, e.g., multiple steel rollers, although other materials other than steel may be used to form the rollers. The magnetic recording medium 30 is then wound a second time.

In one embodiment, the magnetic recording medium 30 also proceeds through a heat soak process. The heat soak process generally places a completed, wound roll of the magnetic tape medium 30 into an environment of 50° F. for 48 hours to advance the cure of the magnetic recording medium materials and to cause relaxation of residual stresses within the magnetic recording medium 30. In one example, much of the pitting or embossment of the recording layer 56 is caused during this heat soak process. The wound and processed roll of magnetic recording medium 30 is then split, burnished, and tested for defects according to methods known in the industry.

Surface Measurement Parameters of the Backside Surface

In one embodiment, the backside surface 42 is analyzed to determine values for a plurality of surface measurement parameters. More particularly, the backside surface 42 is analyzed to determine the surface measurement parameters using a Wyko® Optical Profiler manufactured by Veeco Instruments, Inc. of Tucson, Ariz., or other suitable device. More specifically, the values used throughout this application were measured using a Wyko® Optical Interferometer. In one example, at least a portion of the surface measurement parameters analyzed includes skew, peak height mean, peak-to-valley roughness, plateau ratio, and kurtosis.

Skew ($R_{sk}$) is the third moment of a roughness distribution and measures the asymmetry of the surface profile about a mean plane of the surface being evaluated. Negative skew indicates a predominance of valleys, while positive skew indicates a predominance of peaks. Skew illustrates load carrying capacity, porosity and other characteristics. Negative skew generally is a criterion for a good bearing surface. With regard to magnetic recording medium 30, it is generally desirable to decrease positive skew by decreasing the predominance of high peaks, and, consequently, decreasing the number and/or size of pits or embossments. However, it is also generally desirable to maintain at least a low level of positive skew to decrease the excess frictional forces on the magnetic recording medium that can cause handling problems during use of the magnetic recording medium. In one embodiment, the magnetic recording medium 30 has a skew of less than about 0.5.

Peak Height Mean ($R_{pm}$) refers to the mean height of the peaks 42 extending above a standard plane of backside surface 42 over the length of the magnetic recording medium 30. In this respect, a low peak height mean indicates that few large peaks are present, which generally translates to fewer embossments being formed in the recording surface 56. In one embodiment, the peak height mean of the magnetic recording medium 30 is less than about 200 nm.

Peak-to-Valley Roughness ($R_z$) is an average maximum profile of the ten greatest peak-to-valley separations in the evaluation area. The peak-to-valley separations are determined by measuring the distance from the top of a peak to the bottom of an adjacent valley. Peak-to-valley roughness is useful for evaluating surface texture on limited-access surfaces, particularly where the presence of high peaks or deep valleys is of functional significance, such as for the magnetic recording medium 30. A low peak-to-valley roughness generally indicates a smoother surface. Since the peaks 64 defined by the magnetic recording medium 30 generally are smaller than prior art peaks, the magnetic recording medium 30 generally decreases the peak-to-valley roughness of the magnetic recording medium 30. In one embodiment, peak-to-valley roughness of the magnetic recording medium 30 is less than about 325 nm, preferably less than 300 nm.

Plateau Ratio ($R_{pm}/R_z$) refers to the degree of rise in peaks of a surface and is based upon the peak height mean and the peak-to-valley roughness. Accordingly, a low plateau ratio generally indicates that the peaks 64 are more rounded or plateau-like as opposed to high plateau ratio, which generally indicates that the peaks 64 are more spike-like in appearance. In one embodiment, the magnetic recording medium 30 has a relatively low plateau ratio. In one example, the plateau ratio of the magnetic recording medium 30 is less than 0.65.

Kurtosis ($R_{ku}$) is a measure of the distribution of spikes above and below the mean line of the backside surface 42 and generally indicates the randomness of the surface. In particular, kurtosis is the fourth derivative of the roughness distribution of the measured surface. In general, for relatively spiky surfaces, kurtosis is greater than three; for wavy surfaces, kurtosis is less than three; and for perfectly random surfaces, kurtosis is generally equal to three. For instance, in one example, a truly Gaussian surface generally has a kurtosis value of three. As such, it is desirable to have a surface roughness approximating a Gaussian surface as opposed to a bimodal surface of prior art, magnetic recording mediums. In one embodiment, magnetic recording medium 30 has a kurtosis of less than or equal to about 4.0, more preferably of less than or equal to about 3.7.

A magnetic recording medium 30 according to embodiment of the present invention provides a backside formed of relatively uniform carbon black particles. The use of relatively uniform carbon black particles provides a more random surface profile resulting in peaks being formed on the surface with less height than the backside surfaces generally seen in the prior art. Moreover, the larger peaks formed in the backside surface are larger in number providing increased surface area interface between a recording surface of a first winding and a backside of an adjacent or second winding. In this manner, pressure in a wound magnetic recording medium is more evenly distributed across the recording surfaces and the number of and/or prominence of pits or embossments is decreased. Accordingly, by decreasing the number and/or prominence of pits or embossments, the signal-to-noise ratio, such as the skirt signal-to-noise ratio, is increased and errors, such as the small errors, are decreased with respect to other magnetic recording mediums (for example, see the experimental results below). Similarly, in one embodiment, variations in the skirt signal-to-noise ratio and small errors are also limited along the total length of the magnetic recording medium.

Although specific embodiments have been described herein for purposes of describing the embodiments, it will be appreciated by those of ordinary skill in the art that a wide variety of alternate and/or equivalent implementations calculated to achieve the same purposes may be substituted for the specific embodiments described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

EXAMPLES

The following table lists surface measurement parameters of various magnetic recording media measured with a Wyko® Optical Interferometer. Table 1 illustrates that Examples 1 and 2 exhibit decreased skew, peak mean height, peak-to-valley roughness, plateau ratio, and kurtosis with respect to Comparative Examples C1–C4. The decreased surface measurement values lead to a decrease in the number of and/or level of pits or embossments formed in adjacent layers of tape, therefore, also decreasing the errors and increasing the signal-to-noise ratios of the magnetic recording mediums.

TABLE 1

| | Surface Measurement Parameters | | | | |
|---|---|---|---|---|---|
| Example | Skew ($R_{sk}$) | Peak Mean Height ($R_{pm}$) | Peak-to-Valley Roughness ($R_z$) | Plateau Ratio ($R_{pm}/R_z$) | Kurtosis ($R_{ku}$) |
| 1 | 0.30 | 177 nm | 291 nm | 0.61 | 3.4 |
| 2 | 0.40 | 172 nm | 276 nm | 0.62 | 3.5 |
| C1 | 0.53 | 234 nm | 346 nm | 0.68 | 4.3 |
| C2 | 0.80 | 327 nm | 449 nm | 0.73 | 5.6 |
| C3 | 0.90 | 369 nm | 515 nm | 0.72 | 5.2 |
| C4 | 0.89 | 482 nm | 675 nm | 0.71 | 5.2 |

Examples 1 and 2

Examples 1 and 2 in Table 1 are magnetic recording tapes comprising a magnetic side coated on a top surface of a PEN substrate. A backside is layered on a bottom surface of the PEN substrate, wherein the bottom surface is opposite the top surface. The backsides of each example include titanium dioxide filler particles, alumina wear particles, a dispersant for pigments, a hard binder, a soft binder, and an activator. In one embodiment, these components form a total of about 60 percent to about 70 percent per unit weight of the backside. More specifically, the backside in Example 1 includes titanium dioxide filler particles at about 10.6 percent, alumina wear particles at about 2.2 percent, a dispersant for pigments at about 2.0 percent, a hard binder at about 22.2 percent, a soft binder at about 14.8 percent, and an activator at about 15.2 percent where all percents are based on the weight of the backside dispersion. The backside of Example 2 includes titanium dioxide filler particles at about 11.2 percent, alumina wear particles at about 2.3 percent, a dispersant for pigments at about 2.1 percent, a hard binder at about 22.5 percent, a soft binder at about 14.9 percent, and an activator at about 10.2 percent where all percents are based on the weight of the backside dispersion.

The backside for each of Example 1 and Example 2 are formed with solvents including about 75 percent per unit weight of methylethylketone, about 20 percent per unit weight of toluene, and about 5 per unit weight cyclohexanone.

In Example 1, the backside also includes about 8.3 percent per unit weight of conductive carbon black having a primary size of about 15 nm and about 24.7 percent per unit weight of conductive carbon black having a primary size of about 24 nm. In Example 2, the backside includes about 36.8 percent of conductive carbon black having a primary size of about 24 nm. Accordingly, Examples 1 and 2 are example magnetic recording mediums with similarly sized carbon black particles that do not generally include carbon black textured particles. As illustrated, similarly sized carbon black particles may be formed from more than one size of carbon black particles (as in Example 1) or may be formed from a single size of carbon black particles (as in Example 2). However, in either case the size of carbon black particles are all relatively similar or uniform.

Comparative Example C1

The magnetic recording tape of Comparative Example C1 includes a magnetic side coated on a top surface of a PEN substrate. A backside is layered on a bottom surface of the PEN substrate. The backside of Comparative Example C1 is formed with similar amounts of titanium dioxide filler particles, alumina wear particles, a dispersant for pigments, a hard binder, a soft binder, and an activator as described with respect to Examples 1 and 2. More specifically, the backside in Comparative Example C1 includes titanium dioxide filler particles at about 11.1 percent, alumina wear particles at about 2.2 percent, a dispersant for pigments at about 2.1 percent, a hard binder at about 22.5 percent, a soft binder at about 14.9 percent, and an activator at about 10.2 percent where all percents are based on the weight of the backside dispersion.

Comparative Example C1 further includes about 36.7 percent per unit weight of conductive carbon black particles with a primary size of about 24 nm as well as about 0.2 percent per unit weight of silica texture particles having a primary size of about 700 nm. Accordingly, use of the silica texture particles increases the height of peaks formed in the resultant magnetic tape medium, which as seen in Table 1 generally leads to increased surface parameter measurements as compared to Examples 1 and 2.

Comparative Examples C2–C4

The magnetic recording tapes of Comparative Examples $C_2$–$C_4$ include a magnetic side layered on a top surface of a PEN substrate. A backside is coated on a bottom surface of the PEN substrate. The backsides of Comparative Examples $C_2$–$C_4$ are each formed with similar amounts of titanium dioxide filler particles, alumina wear particles, a dispersant for pigments, a hard binder, a soft binder, and an activator as described with respect to Examples 1 and 2. More specifically, the backside in Comparative Example C2 includes titanium dioxide filler particles at about 11.0 percent, alumina wear particles at about 2.3 percent, a dispersant for pigments at about 2.1 percent, a hard binder at about 22.5 percent, a soft binder at about 14.9 percent, and an activator at about 10.2 percent where all percents are based on the weight of the backside dispersion.

Comparative Example C2 further includes about 36 percent per unit weight of conductive carbon black particles with a primary size of about 24 nm as well as about 1.0 percent per unit weight of carbon black texture particles having a primary size of about 270 nm. Accordingly, use of the carbon black texture particles increases the height of peaks and other surface measurement parameters of the resultant magnetic tape medium, which generally lead to higher rates of and more pronounced embossments.

Comparative Examples C3 and C4 are formed similar to Comparative Example C2, except Comparative Examples C3 and C4 include about 3 percent and about 6 percent per unit weight, respectively, of carbon black texture particles having a primary size of about 270 nm with respect to the total weight of the backside components. As such, Comparative Examples C3 and C4 generally further increase the number of peaks as opposed to Comparative Example C2.

Small Errors and Skirt Signal-to-Noise Ratios

Figure 4:
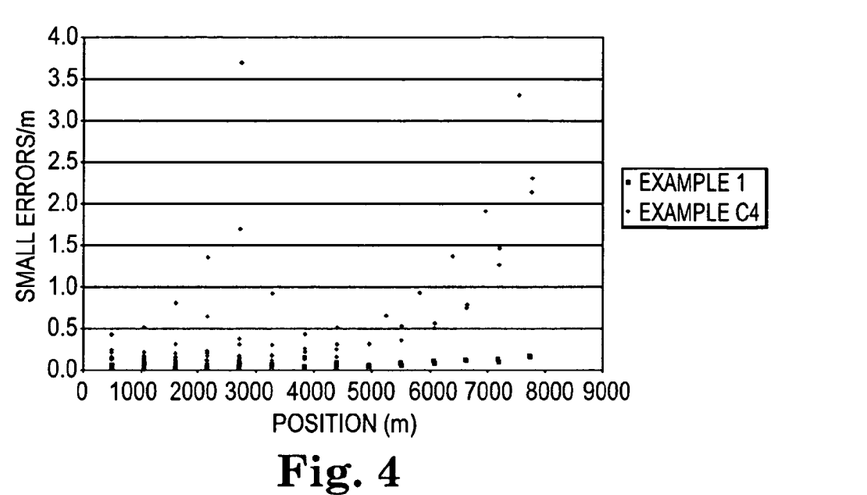
FIG. 4 is a graph illustrating experimental small error results per meter versus the longitudinal position along a length of a variety of magnetic recording media.
Figure 5:
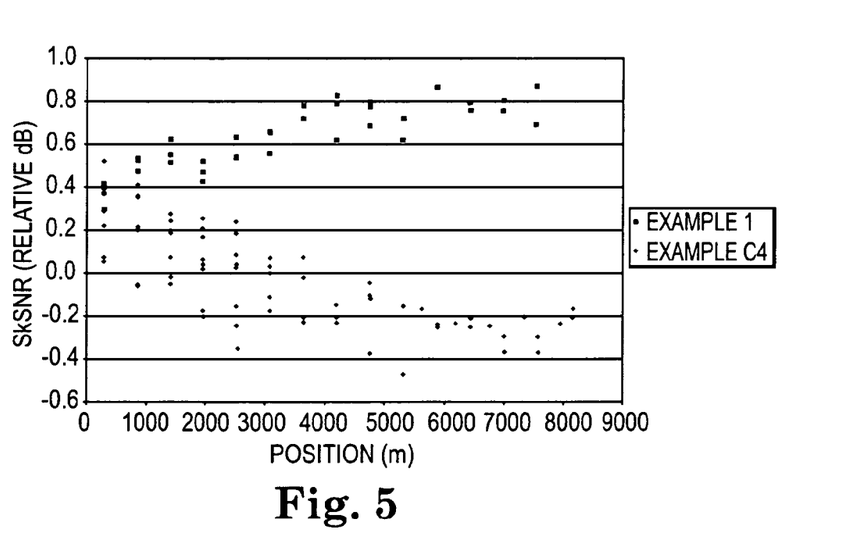
FIG. 5 is a graph illustrating experimental skirt signal-to-noise ratio results versus the longitudinal position along a length of a variety of magnetic recording media.

FIGS. 4 and 5 are graphs illustrating the additional benefits of the magnetic recording tape of Example 1 versus the magnetic recording tape of Comparative Example C4. In particular, FIG. 4 illustrates the small errors occurring along a length of the magnetic recording tape. A "small error" refers to an area of the magnetic recording medium where the level of signal stored in an area is considerably lower than the actual signal that was recorded to that area. As such, a small error essentially refers to a defect on the magnetic recording medium. Small errors generally refer to errors that are 3 or less bits in length at the fundamental write frequency of the magnetic recording medium.

Accordingly, the horizontal axis in FIG. 4 indicates the longitudinal position along the magnetic recording tape up to 9000 m, and the vertical axis indicates the number of errors detected per meter. As illustrated, the number of small errors is considerably less at each longitudinal position along the magnetic recording tape tested for Example 1 as compared to Comparative Example C4. More specifically, the magnetic recording tape of Example 1 exhibits a small error rate of less than about 0.5 errors/m along a substantial entirety of a total length of the magnetic recording tape. Since it is desirable to decrease the occurrence of small errors, a magnetic recording medium formed in a similar manner as for Example 1 is, therefore, believed to be more reliable than a magnetic recording medium formed similar to Comparative Example C4.

Similarly, FIG. 5 illustrates the skirt signal-to-noise ratio occurring along the length of the magnetic recording tapes tested. The skirt signal-to-noise ratio (SkSNR) is a measure of the modulation noise when observing noise sources at frequencies close to the fundamental write frequency of the magnetic recording medium. The skirt signal-to-noise ratio is typically measured by comparing the peak signal power and the integrated noise power within 102 megahertz of the fundamental write frequency of the magnetic recording medium. One example method of measuring the skirt signal-to-noise ratio is described in ECMA International Standard 319.

Accordingly, the horizontal axis indicates the longitudinal position along the magnetic recording tape up to 9000 m, and the vertical axis indicates the skirt signal-to-noise ratio measured at the corresponding location along the magnetic recording tape. As illustrated, the skirt signal-to-noise ratio of the magnetic recording tape of Example 1 is consistently higher at nearly all locations along the magnetic recording tape as compared to the skirt signal-to-noise ratio along the magnetic recording tape of Comparative Example C4. In particular, the magnetic recording tape of Example 1 exhibits a skirt signal-to-noise ratio greater than about 0.2 relative dB along a substantial entirety of a total length of the magnetic recording tape. Surprisingly, the skirt signal-to-noise ratio of Example 1 actually improves as magnetic tape stored near the center of the wound tape (i.e., towards the 9000 m end of the magnetic recording tape). Since a higher skirt signal-to-noise ratio indicates a stronger signal, the magnetic recording tape of Example 1 provides for a consistently stronger signal than the magnetic recording tape of Comparative Example C4.

What is claimed is:

1. A magnetic recording medium comprising:
    a substrate defining a first surface and a second surface opposite the first surface;
    a magnetic side formed over the first surface of the substrate and defining a recording surface; and
    a backside coated on the second surface of the substrate and configured to decrease embossment of the recording surface, the backside defining a backside surface opposite the substrate, the backside surface having a skew less than about 0.5 and a kurtosis less than about 4.0.

2. The magnetic recording medium of claim 1, wherein the magnetic side includes at least one layer, and the at least one layer includes a magnetic recording layer.

3. The magnetic recording medium of claim 1, wherein the backside surface has a peak height mean less than about 200 nm.

4. The magnetic recording medium of claim 1, wherein the backside surface has a peak-to-valley roughness less than about 325 nm.

5. The magnetic recording medium of claim 4, wherein the peak-to-valley roughness is less than about 300 nm.

6. The magnetic recording medium of claim 1, wherein the backside surface has a plateau ratio of less than or equal to about 0.65.

7. The magnetic recording medium of claim 1, wherein the kurtosis value is less than or equal to about 3.7.

8. The magnetic recording medium of claim 1, wherein the magnetic recording medium has a skirt signal-to-noise ratio of greater than about 0.2 relative dB along a substantial entirety of a total length of the magnetic recording medium.

9. The magnetic recording medium of claim 1, wherein a first skirt signal-to-noise ratio measured at any first location along a total length of the magnetic recording medium varies from a second skirt signal-to-noise ratio measured at any second location along the total length of the magnetic recording medium by less than about 0.5 dB.

10. The magnetic recording medium of claim 1, wherein the magnetic recording medium has a small error rate of less than about 0.5 errors/m along a substantial entirety of a total length of the magnetic recording medium.

11. The magnetic recording medium of claim 1, wherein a first small error rate measured at any first location along a total length of the magnetic recording medium varies from a second small error rate measured at any second location along the total length of the magnetic recording medium by less than about 0.25 error/m.

12. The magnetic recording medium of claim 1, wherein the backside includes a plurality of carbon black particles having an average size less than or equal to 30 nm.

13. The magnetic recording medium of claim 12, wherein the plurality of carbon black particles have an average size less than or equal to 25 nm.

14. The magnetic recording medium of claim 12, wherein the carbon black particles include a first group and a second group of carbon black particles, the first group having a different average particle size than the second group, and further wherein each of the first group and the second group have an average particle size of less than or equal to about 24 nm.

15. A magnetic recording medium comprising:
a substrate defining a first surface and a second surface opposite the first surface;
a magnetic side coated on the first surface of the substrate and defining a recording surface; and
a backside coated on the second surface of the substrate and configured to decrease the embossment of the recording surface, wherein the backside defines a backside surface opposite the substrate, the backside surface having a peak height mean less than about 200 and a peak-to-valley roughness less than about 325 nm.

16. The magnetic recording medium of claim 15, wherein the backside surface has a skew less than about 0.5.

17. The magnetic recording medium of claim 15, wherein the peak-to-valley roughness is less than about 300 nm.

18. The magnetic recording medium of claim 15, wherein a first skirt signal-to-noise ratio measured at any first location along a total length of the magnetic recording medium varies from a second skirt signal-to-noise ratio measured at any second location along the total length of the magnetic recording medium by less than about 0.5 dB.

19. The magnetic recording medium of claim 15, wherein a first small error rate measured at any first location along a total length of the magnetic recording medium varies from a second small error rate measured at any second location along the total length of the magnetic recording medium by less than about 0.25 error/m.

20. A magnetic recording medium comprising:
a substrate defining a first surface and a second surface opposite the first surface;
a magnetic side coated on the first surface of the substrate and defining a recording surface; and
a backside coated on the second surface of the substrate and configured to decrease the embossment of the recording surface, wherein the backside defines a backside surface opposite the substrate, the backside surface having a skew less than about 0.5, a kurtosis less than about 4.0, a peak height mean of less than about 200, and a peak-to-valley roughness less than about 325 nm.

* * * * *